United States Patent Office 3,131,191
Patented Apr. 28, 1964

3,131,191
PROCESS FOR THE PREPARATION OF
NORAPORPHINES
Bryce Douglas, Embreeville, Pa., and Jerry A. Weisbach, Cherry Hill, N.J., assignors to Smith Kline & French Laboratories, Philadelphia, Pa., a corporation of Pennsylvania
No Drawing. Filed Aug. 8, 1962, Ser. No. 215,502
3 Claims. (Cl. 260—285)

This invention relates to a novel process for the preparation of noraporphines and to the products thereby formed.

The fundamental nucleus of the noraporphine molecule may be represented as follows:

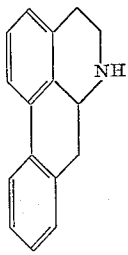

I

According to accepted principles of nomenclature, the designation "nor" refers to the absence of the methyl group on the nitrogen atom in such a ring system. Various naturally occurring alkaloids possessing pharmacological properties are substituted derivatives thereof; representative of these are anonaine, anolobine, xylopine, toduranine, actinodaphnine, laurotetanine and norisocorydine. Few of these compounds have been totally synthesized by chemical methods, the result of a present absence of suitable synthetic procedures. One route which has been employed for this synthesis involves use of the Bischler-Napieralski reaction followed by a Pschorr condensation of the resultant 3,4-dihydroisoquinoline. This route however, as heretofore practiced, produces poor yields and is inherently limited in its application to new compounds in this series in which the nitrogen group is unsubstituted.

According to the process of this invention, it is possible not only to prepare synthetically these known alkaloids of the noraporphine structure, but further to prepare new and heretofore unknown compounds which demonstrate analgesic, anti-inflammatory and/or antitussive properties. There are therefore provided by virtue of this process compounds having the following structural formula:

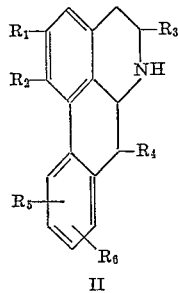

II wherein
$R_1$ and $R_2$ are each hydrogen, lower alkoxy or taken together lower alkylenedioxy,
$R_3$ and $R_4$ are hydrogen or lower alkyl, and
$R_5$ and $R_6$ are each hydrogen, halogen, hydroxy, lower alkyl, lower alkoxy or trifluoromethyl.

According to this process a 3,4-dihydroisoquinoline is prepared by the cyclo-dehydration of a 2-nitrobenzyl-$\beta$-phenethylamide with a suitable condensing agent such as phosphorus pentoxide or phosphorus oxychloride as is known to the art. The dihydroxyisoquinoline derivative however is then treated with benzyl halide such as benzyl bromide in a nonaqueous inert organic solvent such as benzene. There is then formed the corresponding N-benzyl derivative. The reaction is preferably executed at the reflux temperature of the organic solvent.

The resulting N-benzyl-1-(2'-nitrobenzyl)-3,4-dihydro-isoquinolinium bromide is then reduced with a bimetallic hydride such as sodium borohydride and the product directly treated with zinc dust and sulfuric acid. There is thus formed an N-benzyl-1-(2'-aminobenzyl)-1,2,3,4-tetrahydroisoquinoline. This amine is then condensed by diazotization and heating, the latter preferably under an inert atmosphere, and the corresponding N-benzylnoraporphine is thus formed. Reduction of this compound, as for example by catalytic hydrogenation, then yields the desired noraporphine. The catalyst employed in this hydrogenation is generally palladium on an inert carrier such as palladium-on-carbon and the solvent, an inert organic solvent such as ethanol, dioxane, dimethylformamide and the like.

These overall reactions may be represented as follows:

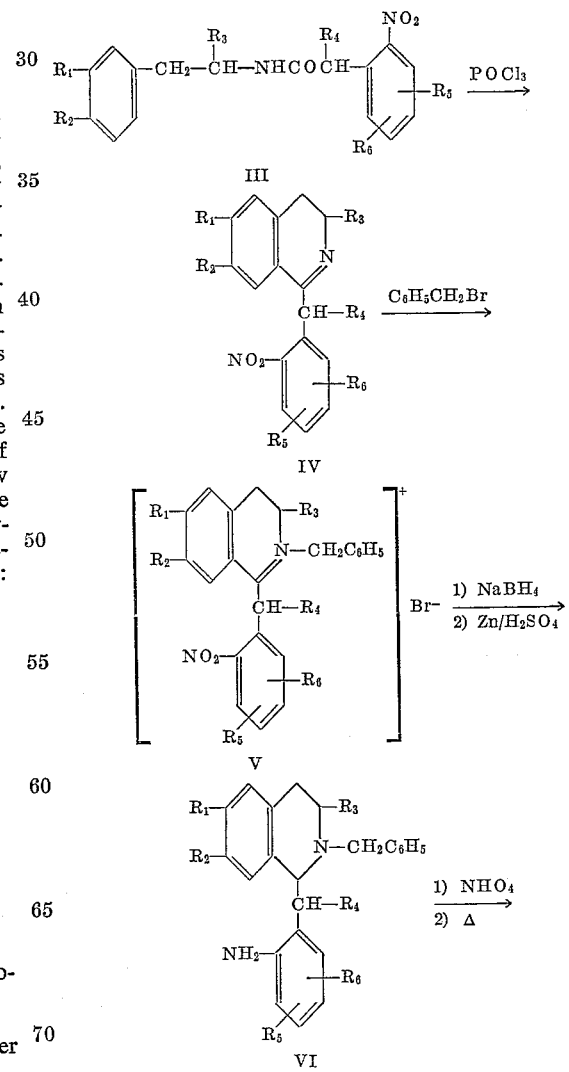

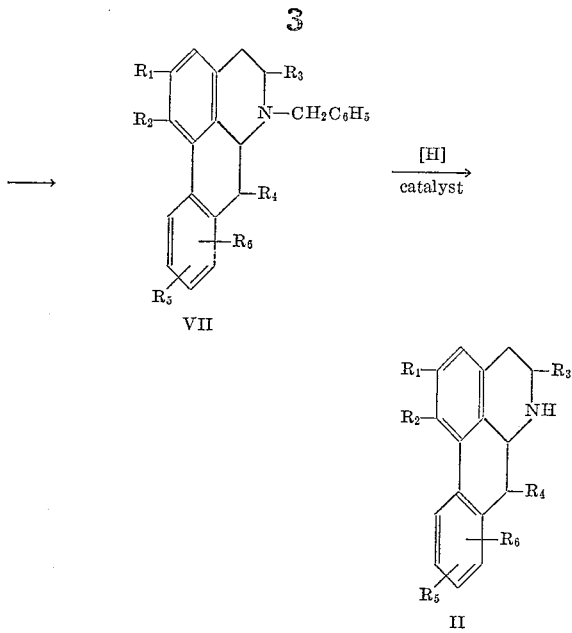

It will be observed that the process represented above involves the known Bischler-Napieralski reaction and Pschorr condensation but has been modified by the prior introduction of a protective group after execution of the known synthetic steps. By virtue of these modifications, we have been able to consistently realize far higher yields with a corresponding decrease in undesirable side products.

The substituents present on the nucleus of the above compounds may of course be varied readily according to methods known to the art. Thus for example, any of the lower alkoxy groups may be cleaved to yield a hydroxy group which may be further modified as by esterification or the like. These modifications however do not affect the underlying nature of this invention by which is provided a novel route for the preparation of the fundamental noraporphine nucleus.

Particularly valuable compounds are those of Formula II above where each or both of $R_5$ and $R_6$ are alkoxy, e.g., methoxy, or halogen, e.g., chloro.

The following examples will serve as additional exemplification of this invention but are not to be construed as limiting the scope thereof.

*Example 1*

A mixture of 110 g. (0.337 mole) of 1-(2'-nitrobenzyl)-6,7-dimethoxy-3,4-dihydroisoquinoline, 216 g. (1.25 moles) of benzylbromide in 400 ml. of benzene is heated at reflux for 4 hours. The reaction mixture is then allowed to stand at about 25° C. for 12 hours and the solid which thus forms, collected by filtration and triturated with warm benzene. This solid is then dried and recrystallized to yield 1-(2'-nitrobenzyl)-2-benzyl-6,7-dimethoxy-3,4-dihydroisoquinolinium bromide.

To a stirred solution of 125 g. (0.25 mole) of this quaternary salt in methanol is added 31.5 g. (0.83 mole) of sodium borohydride. After allowing the mixture to stir for 30 minutes, there is added 500 g. of zinc dust followed by 1750 ml. of 2 M sulfuric acid. After this addition is complete, the mixture is stirred for 30 minutes, filtered, rendered alkaline with ammonium hydroxide and extracted with ether. The ethereal extracts are washed with a saturated aqueous solution of sodium chloride and dried over sodium sulfate. The solvent is then removed in vacuo. Trituration of the residue with absolute ethanol then yields a solid which is recrystallized from ethanol to yield 1-(2'-aminobenzyl)-2-benzyl-6,7-dimethoxy-1,2,3,4-tetrahydroquinoline.

A solution of 55.5 g. (0.143 mole) of 1-(2'-aminobenzyl)-2-benzyl-6,7-dimethoxy-1,2,3,4-tetrahydroquinoline in 575 ml. of acetic acid and 40 ml. of sulfuric acid is cooled to about 10° C. and to it is added in a dropwise fashion 11.60 g. (0.168 mole) of sodium nitrite in 107 ml. of water. Upon completion of this addition, the mixture is stirred at 10° C. for 20 minutes and there is then added 1.0 g. 0.013 mole) of sulfamic acid, 0.5 g. (0.005 mole) of cuprous chloride and 1200 ml. of acetone. This mixture is heated at refluxed temperature of 30 minutes and then concentrated in vacuo to remove the acetone. Dilute ammonia is then added until the residue is alkaline and the resultant solution then exhaustively extracted with ether. The combined ethereal extracts are washed with a saturated solution of sodium chloride and dried over sodium sulfate. The solvent is then removed in vacuo and the resultant oil is chromatographed over a neutral alumina column, eluting with ether. Evaporation of the ether and recrystallization from methanol then yields N-benzyl-5,6-dimethoxynoraporphine.

A mixture of 0.5 g. of N-benzyl-5,6-dimethoxynoraporphine and 3.0 g. of 10% palladium-on-carbon in 300 ml. of 95% ethanol and 10 ml. of hydrochloric acid is shaken under three atmospheres of hydrogen for 16 hours. At the end of this time, the mixture is filtered and concentrated in vacuo to about 50 ml. Ether is then added and the solid which precipitates, collected by filtration, dried, and recrystallized from methanol to yield 5,6-dimethoxynoraporphine hydrochloride.

*Example 2*

A mixture of 100 g. (0.216 mole) of 1-(4'-benzyloxy-3' - methoxy-6'-nitrobenzyl)-6,7-dimethoxy-3,4-isoquinoline, 200 g. (1.17 mole) of benzyl bromide and 300 ml. of chloroform is boiled at reflux for six hours. The reaction mixture is allowed to stand overnight at 25° then cooled to 0° and filtered. The solid thus collected is dried and recrystallized to yield 1-(4'-benzyloxy-3'-methoxy-6'-nitrobenzyl) - 2-benzyl-6,7-dimethoxy-3,4-isoquinolinium bromide.

To a warmed stirred solution of 100 g. (0.158 mole) of 1-(4'-benzyloxy-3'-methoxy-6'-nitrobenzyl)-2-benzyl-6,7-dimethoxy-3,4-dihydroisoquinolinium bromide in one liter of methanol there is gradually added 50 g. (1.35 moles) of sodium borohydride. The mixture is stirred for one hour, concentrated to dryness in vacuo, and then partitioned between chloroform and water, the chloroform layer being successively washed with water and saturated sodium chloride solution and dried over sodium sulfate. The solvent is removed in vacuo. Trituration of the residue with absolute ethanol yielded a solid which is recrystallized from ethanol to yield 1-(4'-benzyloxy-3'-methoxy - 6' - nitrobenzyl)-2-benzyl-6,7-dimethoxy-1,2,3,4-tetrahydroisoquinoline.

A mixture of 100 g. (0.18 mole) of 1-(4'-benzyloxy-3'-methoxy - 6' - nitrobenzyl)-2-benzyl-6,7-dimethoxy-1,2,3,4-tetrahydroisoquinoline, 400 g. (6.1 mole) of zinc dust and one liter of acetic acid is vigorously stirred and maintained at 15° for 24 hours. The mixture is filtered and rendered basic with ammonia, the temperature being maintained below 15°. The resultant mixture is extracted with chloroform and these extracts successively washed with dilute ammonia solution, water and saturated sodium chloride solution and dried over sodium sulfate. Removal of solvent in vacuo yields a solid which is recrystallized from ethanol to yield 1-(4'-benzyloxy-3'-methoxy-6' - aminobenzyl)-2-benzyl-6,7-dimethoxy-1,2,3,4-tetrahydroisoquinoline.

To the mixture of 40 g. (0.076 mole) of 1-(4'-benzyloxy-3'-methoxy-6'-aminobenzyl)-2-benzyl-6,7-dimethoxy-1,2,3,4-tetrahydroisoquinoline in 18 ml. of sulfuric acid and 240 ml. of acetic acid at about 10° C. there are added 6.0 g. (0.087 mole) of sodium nitrite in 40 ml. of water. When the addition is complete, the mixture is stirred at 10° for 30 minutes. One gram of sulfamic acid, 1 g. of cuprous chloride, and a solution of 50 g. of sodium acetate in 700 ml. water are added and the mixture heated on the steam bath for 15 minutes, after which it is cooled to 10°, neutralized with ammonia and extracted with chloroform. These chloroform extracts are washed and dried as above. Removal of solvent in vacuo yields an oil which is chromatographed on neutral alumina and eluted with ether to yield 5,6-dimethoxy - 8 - benzyloxy-9-methoxy-N-benzylnoraporphine.

A mixture of 5,6-dimethoxy-8-benzyloxy-9-methoxy-N-benzylnoraporphine, 5 g. (0.049 mole) hydrochloric acid 50 ml., 95% ethanol (2 l.) and 10% palladium-on-carbon (20 g.) is shaken under three atmospheres of hydrogen for 24 hours. At the end of this time, the mixture is filtered and concentrated in vacuo to about 200 ml. Ether is added and the solid which precipitates is collected, dried and recrystallized from methanol to yield 5,6-dimethoxy-8-hydroxy-9-methoxy-noraporphine.

We claim:
1. In the process for the preparation of noraporphines wherein a 1-(2'-nitrobenzyl)-3,4-dihydroisoquinoline is reduced to a 1-(2'-aminobenzyl)-1,2,3,4-tetrahydroquinoline and said 1-(2'-aminobenzyl)-1,2,3,4-tetrahydroquinoline is converted into the corresponding diazonium salt, said diazonium salt then being heated so as to effect cyclization, the steps which comprise,
   (a) introducing prior to said reduction an N-benzyl group in said 1-(2'-nitrobenzyl)-3,4-dihydroisoquinoline by treatment with a benzyl halide in a non-aqueous inert organic solvent, and
   (b) removing said N-benzyl group subsequent to said cyclization by catalytic hydrogenation wherein said catalyst is palladium-on-inert carrier.
2. The process according to claim 1 wherein the benzyl halide is benzyl bromide.
3. The process according to claim 1 wherein the palladium-on-inert carrier is palladium-on-carbon.

References Cited in the file of this patent
Hirai: Yakugaku Zasshi, vol. 80, pages 608–612 (1960). Copy in 260–288, Div. 6.
Battersby et al.: J. Chem. Soc. pages 3899–3907 (1961) (pages 3901–02 relied on). QD 1. C6.